Sept. 19, 1933.    B. BAUMANN    1,927,625
CONVEYER
Filed March 3, 1932
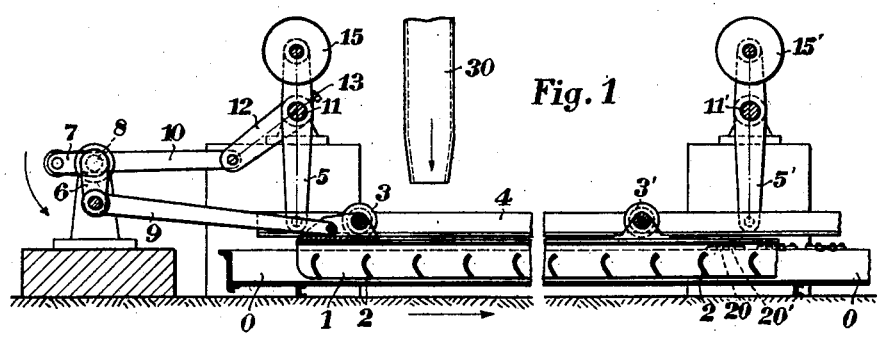
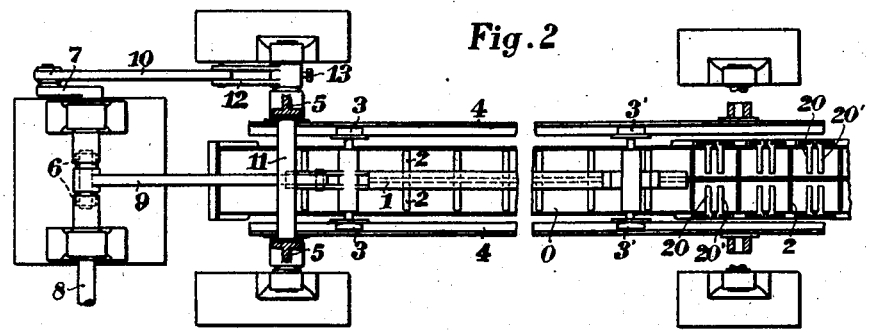
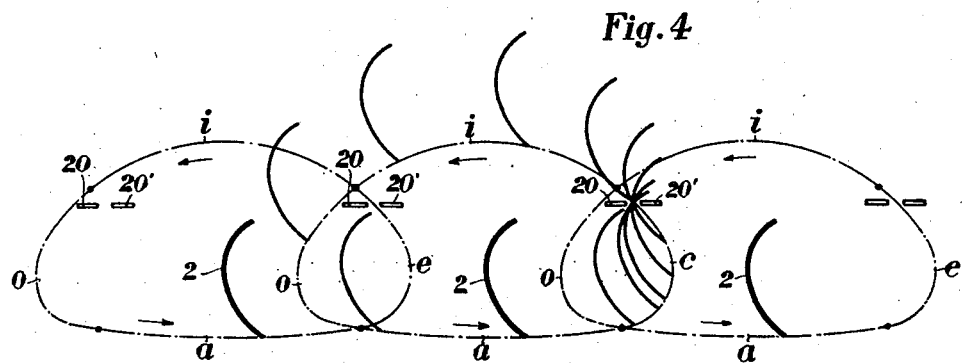
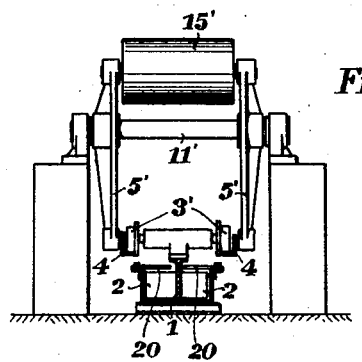
INVENTOR
BRUNO BAUMANN
BY Karl Viertel
ATTORNEY Patented Sept. 19, 1933

1,927,625

UNITED STATES PATENT OFFICE 1,927,625

CONVEYER

Bruno Baumann, Magdeburg, Germany, assignor to the firm: Fried. Krupp Grusonwerk Aktiengesellschaft, Magdeburg-Buckau, Germany Application March 3, 1932, Serial No. 596,556, and in Germany March 6, 1931

4 Claims. (Cl. 198—224)

My invention relates to power operated conveyers and more particularly to improvements in conveyers of the intermittent type, consisting of a trough and a reciprocating feeder and being especially adapted to feed muddy, viscid substances, such as thickened cement slurry and like semifluid masses to a place for treatment for instance to a rotary kiln.

As a matter of fact known to practitioners in this field the problem of positively feeding limited and substantially uniform quantities of muddy, viscid substances offers great difficulties which are mainly due to the sticky nature of said substances, adhering to the feeding members, encrusting and choking the latter and thus seriously impairing their operation. Cleaning the conveyer and restoring it into good working order usually requires considerable time, which often causes a long interruption of the work of the plant and means loss to the proprietor.

The principal object of this invention is to overcome these drawbacks by providing an improved conveyer of the type concerned which is substantially safe against becoming thickly encrusted and choked through the muddy, adhesive material under treatment.

Another object of the invention is to provide an improved conveyer all the vital parts of which are of simple design, easy to be assembled and readily accessible for supervision, adjustment, maintenance and repair.

Other objects of the invention will incidentally become apparent hereinafter.

The nature and scope of the invention are briefly outlined in the appended claims and will be more fully understood from the following specification, taken together with the accompanying drawing in which—

Fig. 1 is a fragmentary side elevation, diagrammatically showing by way of an example a conveyer designed according to this invention.

Fig. 2 is a plan of the conveyer partly in section,

Fig. 3 is a front elevation,

Fig. 4 diagrammatically shows in a larger scale the actual path of movement of the hoe blades of the conveyer and their form and cooperation with stripping blades used for cleaning the hoe blades.

The conveyer proper consists of a linear trough 0 (nought) into which the muddy material under treatment is supplied through a hopper or pipe 30, seen in Fig. 1, and of a reciprocating feeding member in the form of a hoe beam 1— the latter extending substantially in the longitudinal plane of symmetry of the trough.

Curved hoe blades 2 are attached in equal distances from each other to said beam 1, which laterally extend from the latter at both sides thereof, and means are provided for bodily moving the hoe beam 1 in a vertically disposed path of roughly oval shape $a, e, i, o$, the lower run or bottom section $a$ of which being for its greater part a substantially straight line, as seen in Fig. 4 which is sharply bent upwardly at both ends designated $e$ and $o$.

Mechanism of various designs are known in this field for moving reciprocating hoe beams, used as feeders in connection with troughs in an elliptical path and I make no claim thereto except for a special feature of the said path of movement which is roughly oval shaped and so designed that the total lift given to the hoe blades during the return strokes of their reciprocating movements considerably exceeds the total height of the hoe blades 2.

By rather abruptly lifting the hoe blades at the end of their forward stroke and during the early part of their return stroke and through a distance exceeding the total height of the blades the front and rear faces of the latter can be completely cleaned from adhering material in an easy and effective manner and by structurally simple means.

In the embodiment of this invention, shown in the drawing for cleaning the hoe blades 2, spaced stripping blades 20, 20' are provided leaving a relatively narrow gap between them through which the hoe blades 2 will pass at the end of their forward stroke and during the early part of their return stroke, as indicated in Fig. 4.

Those stripping blades 20, 20' are preferably made adjustable for instance by set screws as indicated in Fig. 1, so that they can be fixed at any convenient distance from each other and the hoe blades respectively, and that the stripping action can be modified within certain limits.

In the preferred embodiment of this invention shown in the drawing the mechanism for moving the hoe blades 2 in a roughly oval path of special proportions as indicated, consists of a linear track made of two angular rails 4, 4 and extending substantially parallel to the trough 0, of brackets and rollers 3, 3' for slidably supporting the hoe beam 1 from said track, of means for rocking and thereby incidentally vertically reciprocating the track 4 while retaining its parallel position relatively to the trough 0, and of means for horizontally reciprocating the hoe beam 1 relatively to the track 4.

The said rocking movement of the track 4 and the horizontal reciprocating movement of the hoe beam 1 are both effected by a power driven rotary shaft 8 having two cranks 6 and 7 mounted thereon, which extend at a substantially right angle to each other.

Rocking levers 5 and 5', mounted on shafts 11, 11', are provided for supporting the track 4 and are cooperatively associated with each other and the track so as to extend parallel to each other and retain their relative position to each other, while being swung to and fro by crank 7. The latter is cooperatively connected with shaft 11 carrying the rocking levers 5 through a rod 10 and an actuating arm 12, which extends at an angle to the rocking levers 5; adjusting means known per se and being diagrammatically indicated by a set screw 13 are provided for differentiating within given limits the movement of the rocking levers 5, 5'.

The hoe beam 1 is reciprocated by the other crank 6 and a connecting rod 9, said crank 6 being the leading one of the two in respect of the rotary motion of the shaft 8 indicated by an arrow in Fig. 1.

It will be noted that while the hoe beam 1 is in the middle part of its forward stroke shown in Fig. 1, both the connection rods 9 and 10 are almost parallel to each other.

My experiments have shown that by an actuating mechanism of the design shown and described above the hoe blades 2 are bodily moved in an appropriate oval path for being periodically and effectively cleaned by stripping blades. I prefer to shape the curved blades 2 in such manner that their curvature corresponds to and is more or less a replica of the curve e which is the right end or front section of the oval path of movement of the hoe blades 2.

Various other modifications may be made in the design and cooperation of the component parts of power operated conveyers of the type and for the purpose described above, without substantially deviating from the spirit and the salient ideas of this invention and without sacrificing any advantages obtained thereby. For instance weights 15, 15' may be provided for counterbalancing the track 4 and the feeder 1, as shown in Figs. 1 and 3.

What I claim is:

1. In a conveyer of the type set forth the combination with a stationary trough, of a feeder structure, hoe blades attached to said feeder, actuating means for bodily reciprocating said feeder in a vertically disposed path of roughly oval shape having a substantially straight bottom section and being sharply bent upwardly at both ends, and scraper elements provided for cooperation with the hoe blades.

2. Conveyer of the type set forth and having the features outlined in claim 1, in which the said actuating means comprise a rocking track supporting the feeder, two rotary cranks mounted on a common shaft at right angles to each other, a pitman, connecting one of said cranks—viz. the leading one in the direction of rotation—with the feeder, another pitman and link interconnecting the other crank with the said rocking track.

3. A conveyer of the type set forth and having the features outlined in claim 1, the scraper elements of which are in the form of stripping blades adjustably mounted on the trough structure of the conveyer.

4. Conveyer of the type set forth and having the features outlined in claim 1, in which the cross section of the hoe blades taken vertically therethrough is a curve representing substantially a replica of the front section of the path of movement of the blades, viz. of the end portion of their forward stroke and of the early part of their return stroke.

BRUNO BAUMANN.